(12) United States Patent
Natori (10) Patent No.: US 10,397,531 B2
(45) Date of Patent: Aug. 27, 2019

(54) PROJECTOR, DISPLAY DEVICE, AND DISPLAY METHOD

(71) Applicant: Seiko Epson Corporation, Tokyo (JP)

(72) Inventor: Takashi Natori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 72 days.

(21) Appl. No.: 14/665,734

(22) Filed: Mar. 23, 2015

(65) Prior Publication Data

US 2015/0281660 A1 Oct. 1, 2015

(30) Foreign Application Priority Data

Mar. 31, 2014 (JP) .................................. 2014-072354

(51) Int. Cl.
*H04N 9/31* (2006.01)
*G06F 3/0484* (2013.01)
*H04N 5/232* (2006.01)
*G06F 3/14* (2006.01)

(52) U.S. Cl.
CPC ....... *H04N 9/3179* (2013.01); *G06F 3/04842* (2013.01); *G06F 3/04847* (2013.01); *G06F 3/14* (2013.01); *H04N 5/23216* (2013.01)

(58) Field of Classification Search
CPC .................................................. H04N 9/3197
USPC ........................................................ 348/744
See application file for complete search history.

(56) References Cited

U.S. PATENT DOCUMENTS

2004/0263694 A1 12/2004 Kim
2006/0203133 A1* 9/2006 Fujiwara ............ H04N 5/44513
348/744
2006/0224707 A1* 10/2006 Kawai ................. H04L 41/0803
709/220
2009/0234861 A1* 9/2009 Ramer ..................... G06F 16/68
2011/0216047 A1 9/2011 Ozawa
2013/0038793 A1* 2/2013 Yoshida ........... H04N 21/43615
348/552
2013/0127980 A1* 5/2013 Haddick ................. G06F 3/013
348/14.08

FOREIGN PATENT DOCUMENTS

| JP | 2004-297816 A | 10/2004 |
| JP | 2005-049837 A | 2/2005 |
| JP | 2008-96878 A | 4/2008 |
| JP | 2009-020316 A | 1/2009 |
| JP | 2011-128257 A | 6/2011 |
| JP | 2011-186029 A | 9/2011 |
| JP | 2013-171235 A | 9/2013 |

* cited by examiner

*Primary Examiner* — Jefferey F Harold
*Assistant Examiner* — Sihar A Karwan
(74) *Attorney, Agent, or Firm* — ALG Intellectual Property, LLC (57) ABSTRACT

It is arranged that the portal screen can be displayed or can be prevented from being displayed depending on needs. A projector includes an input section adapted to input a video signal, a determination section adapted to determine whether or not a portal screen, which includes at least one of information related to projection and a plurality of selection items, needs to be displayed based on presence or absence of a video signal input by the input section at the time of startup, and a projection section adapted to project either of a picture corresponding to the video signal and the portal screen in accordance with a determination result by the determination section.

9 Claims, 4 Drawing Sheets

PROJECTOR, DISPLAY DEVICE, AND DISPLAY METHOD

CROSS-REFERENCE TO RELATED APPLICATION

The entire disclosure of Japanese Patent Application No. 2014-072354 filed Mar. 31, 2014 is expressly incorporated by reference herein.

BACKGROUND

1. Technical Field

The present invention relates to display control of a picture.

2. Related Art

Projectors as display devices have been sophisticated, and the usage scenes have been expanded. Therefore, the knowledge of the users of the projectors about electronic equipment has also varied between the users. As a result, there has occurred a situation in which some users can easily make full use of the projectors without checking the manuals on the one hand, while some users do not know what to do for displaying a picture, or even where in the manual to read for the information on the other hand.

On a variety of functions of the projectors, there have been achieved improvements in usability (user-friendliness). For example, in JP-A-2008-96878 (Document 1), there is described a technology of displaying an image, which makes the user select either of storage media each storing image data, on a portal screen in the case in which the storage media are connected.

In the technology described in Document 1, the portal screen itself is displayed irrespective of whether or not a plurality of storage media is connected although the display content is different. Such a screen has a good chance of being beneficial for the users not skilled in the operation of the equipment, but might rather hinder the usability for the users sufficiently skilled in the operation of the equipment.

SUMMARY

An advantage of the invention is to make it possible to display, or stop displaying the portal screen depending on needs.

An aspect of the invention provides a projector including an input section adapted to input a video signal, a determination section adapted to determine whether or not a portal screen, which includes at least one of information related to projection and a plurality of selection items, needs to be displayed based on presence or absence of a video signal input by the input section at the time of startup, and a projection section adapted to project either of a picture corresponding to the video signal and the portal screen in accordance with a determination result by the determination section.

According to the projector, it is possible to make it possible to display the portal screen or to prevent the portal screen from being displayed depending on needs.

The input section may input the video signal from an active input source among a plurality of input sources, and in a case in which the video signal fails to be input from the active input source, the determination section may determine that the portal screen is to be displayed.

By adopting this configuration, it is possible to make the portal screen be displayed in the case in which the video signal is not supplied from the active input source.

In a case in which the input of the video signal from the active input source is broken, the projection section may continue to project the picture, which has been projected immediately before the input is broken, and in a case in which a predetermined time has elapsed from when the input of the video signal from the active input source has been broken, the determination section may determine that the portal screen is to be displayed.

By adopting this configuration, it is possible to prevent the portal screen from being displayed immediately after the input of the video signal from the active input source is broken.

The projector may further include a selection section adapted to select either of the selection items having been displayed in the portal screen in accordance with an operation by the user, and a process execution section adapted to execute a process corresponding to the selection item having been selected by the selection section, and in a case in which the selection by the selection section fails to be fixed and a predetermined condition is fulfilled, the determination section may determine that the portal screen is to be displayed.

By adopting this configuration, it is possible to make the portal screen be displayed in the case in which, for example, the user is wavering over the operation.

The projection section may project the portal screen in which either of the selection items is pointed by a cursor, and the determination section may determine that the portal screen, in which the selection item corresponding to an operation of the user in a case in which the predetermined condition has been fulfilled is pointed by the cursor, is to be displayed.

By adopting this configuration, it is possible to arrange that the information necessary for the user can more easily be obtained.

The input section may input either of the video signals supplied from a plurality of input sources, and in a case in which the video signals are simultaneously supplied from two or more of the input sources, the determination section may determine that the portal screen is to be displayed.

By adopting this configuration, it is possible to display the portal screen in the case in which the input source to be the projection target is not uniquely identified.

Another aspect of the invention provides a display device including an input section adapted to input a video signal, a determination section adapted to determine whether or not a portal screen, which includes at least one of information related to display and a plurality of selection items, needs to be displayed based on presence or absence of a video signal input by the input section at the time of startup, and a display section adapted to display either of a picture corresponding to the video signal and the portal screen in accordance with a determination result by the determination section.

According to the display device, it is possible to make it possible to display the portal screen or to prevent the portal screen from being displayed depending on needs.

Still another aspect of the invention provides a display method of a display device including determining, at the time of startup, whether or not a portal screen, which includes at least one of information related to display and a plurality of selection items, needs to be displayed based on presence or absence of a video signal input, and displaying either of a picture corresponding to the video signal and the portal screen in accordance with the determination result.

According to the display method, it is possible to make it possible to display the portal screen or to prevent the portal screen from being displayed depending on needs.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Embodiment

Figure 1:
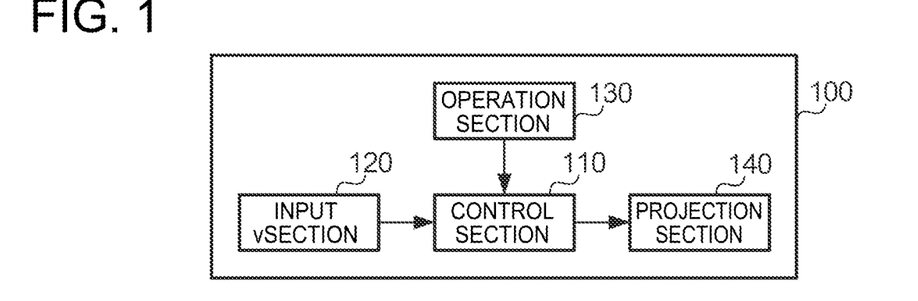
FIG. 1 is a block diagram showing a hardware configuration of a projector.

FIG. 1 is a block diagram showing a hardware configuration of the projector 100 as an example of the invention. The projector 100 is provided with a control section 110, an input section 120, an operation section 130, and a projection section 140.

The control section 110 is a device for controlling actions of the respective sections of the projector 100. The control section 110 is provided with an arithmetic processing device such as a central processing unit (CPU), and a memory for storing data. For example, the control section 110 has the data necessary for displaying a portal screen described later stored in the nonvolatile memory. Further, the control section 110 can also execute a variety of image processing on the picture. The image processing can be realized by a dedicated image processing circuit (i.e., hardware), or can be realized by software.

The input section 120 is a device for inputting a video signal. The input section 120 corresponds to a plurality of input sources. Here, the input sources each denote an external device for supplying the video signal, and a connection method (e.g., standard) with which the external device is connected to the projector 100. The input section 120 is provided with, for example, a LAN (Local Area Network) port, a D terminal, and an HDMI (High-Definition Multimedia Interface; registered trademark) terminal. Further, the input section 120 can also receive the video signal wirelessly using a wireless interface such as wireless LAN or Miracast.

The operation section 130 is a device for receiving the operation of the user. The operation section 130 is configured including, for example, an operation panel, which is disposed to the projector 100, and is provided with a plurality of buttons. Further, the operation section 130 can also be configured including a receiving section for receiving a signal from a remote controller. The operation section 130 supplies the control section 110 with an operation signal representing the operation by the user.

It should be noted that the projector 100 can also be provided with an interactive function. Here, the interactive function denotes a function of making it possible for the user to perform pointing to the image projected by the projector 100 or the like using a pointing body (e.g., a stylus) to thereby draw a handwritten character or perform such an operation as performed with a mouse. In this case, the operation section 130 can receive the operation by the user using the pointing body.

The projection section 140 is a device for projecting a picture. The projection section 140 is provided with a light source, a light modulation element such as a liquid crystal panel, a lens, and so on, and projects a picture, which corresponds to the video signal input, on a projection surface. The projection surface is not particularly limited, but is, for example, a wall surface or a screen. It should be noted that the light modulation element is not limited to the liquid crystal panel, but can also be, for example, a DMD (Digital Mirror Device) or an LCOS (Liquid Crystal On Silicon).

The hardware configuration of the projector 100 is as described above. One of the features of the projector 100 is that the projector 100 has a function of displaying the portal screen in this configuration. Here, the portal screen denotes a screen including information and selection items, which are expected to be frequently used by the user in relation to the projection by the projector 100. It becomes possible for the user to display a desired picture or display the picture in a desired display state (e.g., an image quality) by using the portal screen.

Figure 2:
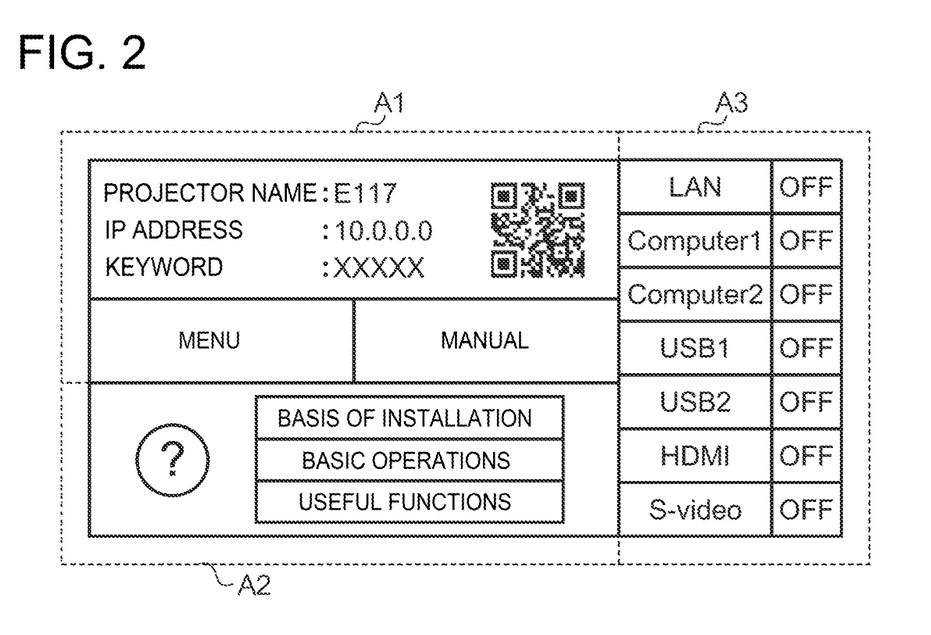
FIG. 2 is a diagram showing an example of a portal screen.

FIG. 2 is a diagram showing an example of the portal screen in the present embodiment. In this example, the portal screen is configured including a first region A1 in which the projector information is displayed, a second region A2 in which a variety of guides of operations are displayed, and a third region A3 in which source information related to the input sources is displayed.

The projector information is information related to connection between the projector 100 and the external devices. The projector information corresponds to, for example, the name (projector name), the IP (Internet Protocol) address, and an SSID (Service Set Identifier) of the projector 100 in the network. It is also possible for the projector information to be partially coded and displayed as one-dimensional or two-dimensional code information (e.g., a bar-code), and be read by an external device (e.g., a smartphone) provided with a shooting function.

In the second region A2, there are displayed the selection items such as a menu or a manual. These display items function as links which can be selected by the user. By placing the cursor on the desired selection item to select the selection item, the user can make the transition from the portal screen to another screen corresponding to the selection item thus selected.

The source information is information representing the input sources, which the projector 100 is compliant with, and the presence or absence of the video signal from each of the input sources. By placing the cursor on either one of the input sources displayed as the selection items to thereby select the input source in the third region A3, the user can switch the active input source. Here, the active input source denotes an input source from which the projector 100 receives the input of the video signal among the plurality of input sources. For example, in the case in which the video signals are supplied simultaneously from two or more input sources, the projector 100 uses the video signal supplied from the active input source for the projection, while the projector 100 does not use but ignores the video signal supplied from the inactive input source.

Figure 3:
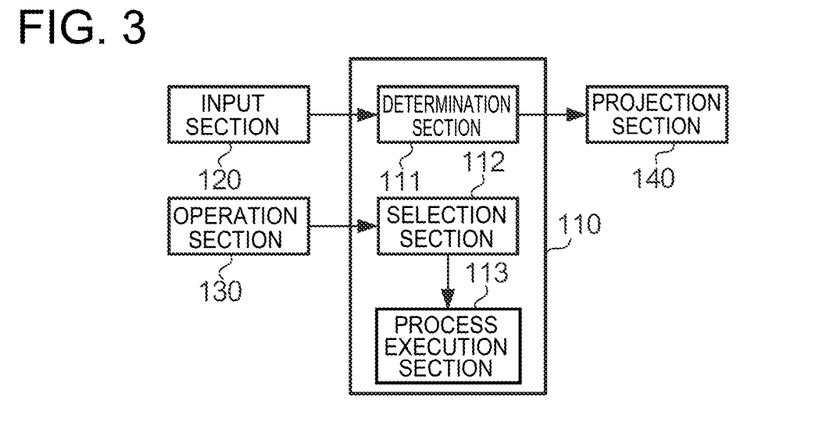
FIG. 3 is a block diagram showing a functional configuration related to display of the portal screen.

FIG. 3 is a block diagram showing a functional configuration related to display of the portal screen of the control section 110. The control section 110 executes a predetermined program to thereby realize a determination section 111, a selection section 112, and a process execution section 113.

The determination section 111 is a device for determining whether or not it is necessary to display the portal screen. The determination section 111 determines whether or not it is necessary to display the portal screen at least at the time of startup, but can also make a determination at other timings as described later. Further, the determination section 111 can determine whether or not it is necessary to display the portal screen based on the presence or absence of the video signal input by the input section 120, but can also use other criteria.

The selection section 112 is a device for selecting either one of the selection items. The selection section 112 selects the selection items based on, for example, the operation by the user. The process execution section 113 is a device for performing the process corresponding to the selection item selected by the selection section 112. The process execution section 113 makes the transition of the screen display from the portal screen to another screen or executes predetermined image processing in accordance with, for example, the selection item selected by the selection section 112.

It should be noted that it is also possible that in the case in which the selection by the selection section 112 is not fixed and a predetermined condition is fulfilled, the determination section 111 determines that the portal screen will be displayed. Here, the predetermined condition corresponds to, for example, the fact that a predetermined time has elapsed while keeping the state in which the selection by the selection section 112 is not fixed, or the fact that the cursor is moved a predetermined number of times. By adopting such a configuration, it becomes possible to display the portal screen in the case in which the user has been confused about what to do next.

Figure 4:
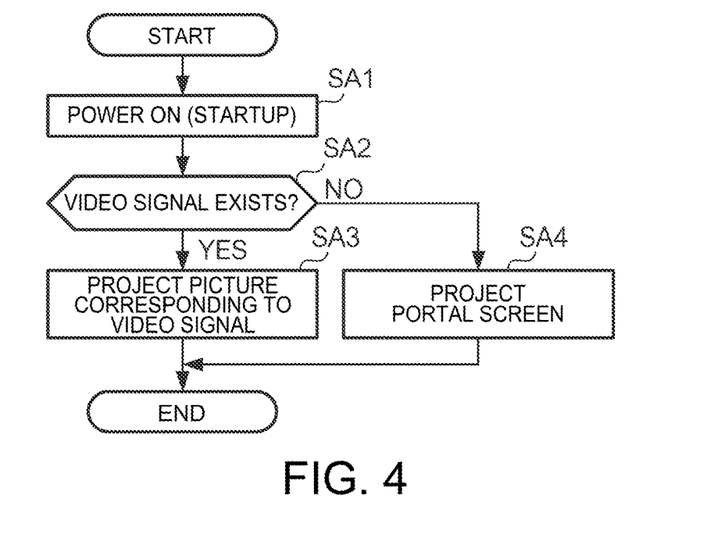
FIG. 4 is a flowchart showing a process executed by the projector at the time of startup.

FIG. 4 is a flowchart showing a process executed by the projector 100 at the time of startup. When the projector 100 is powered on (step SA1), the control section 110 firstly determines (step SA2) whether or not the video signal is supplied from the input source which is in the active state at that moment. If the video signal is supplied from the active input source, the control section 110 makes (step SA3) the projection section 140 project the picture represented by the video signal supplied from the input source. In contrast, if the video signal is not supplied from the active input source, the control section 110 makes (step SA4) the projection section 140 project the portal screen.

It should be noted that if the video signals are supplied from two or more input sources at the time of startup, the control section 110 uses the video signal supplied from the input source, which is in the active state at that moment, for the projection. Alternatively, in the case in which the video signals are supplied from two or more input sources at the time of startup, and all of the input sources are in the inactive state, it is also possible for the control section 110 to use the video signal supplied from either one of the input sources selected under a predetermined rule for the projection, or to make the portal screen be displayed. Further, in the case in which the video signal is supplied from the inactive input source, it is also possible for the control section 110 to switch the state of the input source to the active state to make the picture be projected.

In general, in the case in which the input source to be the projection target can uniquely be identified at the time of startup, it can be said that the intension (i.e., what to display) of the user is explicit. In contrast, in the case in which the input source to be the projection target cannot uniquely be identified at the time of startup, there is a possibility that the operation to be subsequently performed is unclear for the user, or the user is confused about the operation. Therefore, in the case in which the input source to be the projection target is unclear at the time of startup, the projector 100 displays the portal screen to provide the information helpful in the operation of the user in such a case. In contrast, in the case in which the input source to be the projection target can uniquely be identified at the time of startup, the projector 100 performs the control so that the desired picture (i.e., the picture represented by the video signal supplied) is more promptly displayed by preventing the portal screen from being displayed.

Figure 5:
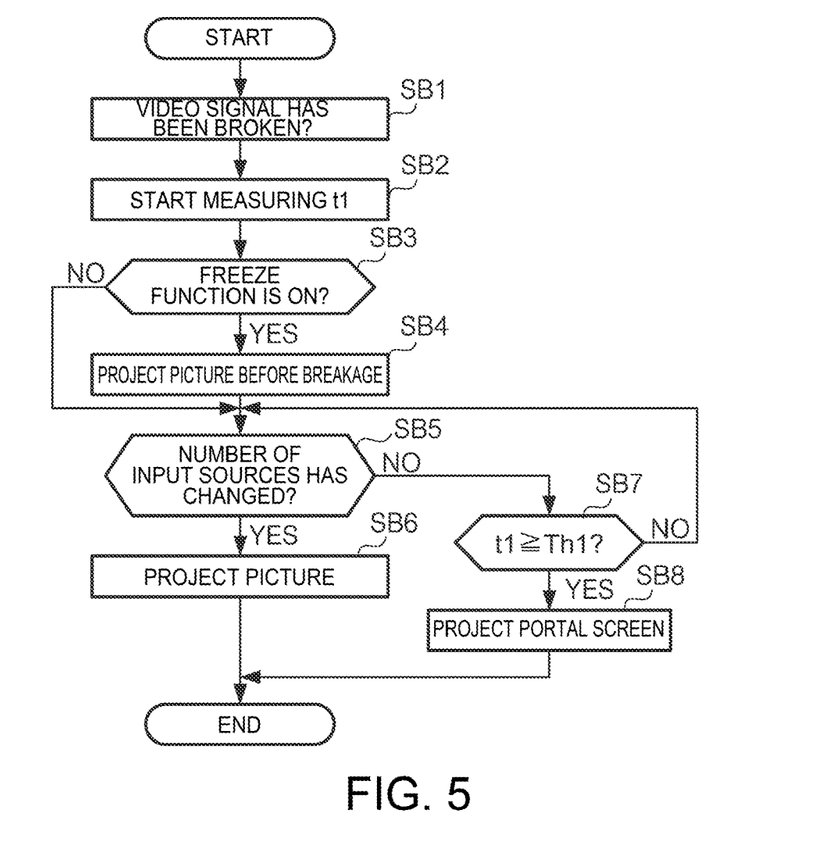
FIG. 5 is a flowchart showing a process executed in the projector.

FIG. 5 is a flowchart showing a process performed in the case in which the video signal is supplied from the active input source, and then the input of the video signal is broken. As such a case, there can be cited the case in which, for example, the user removes a cable for connecting a certain external device and the projector 100 to each other in order to switch the input source.

In the case in which the video signal is broken (step SB1), the control section 110 starts (step SB2) measurement of the elapsed time (t1) from when the video signal is broken. Subsequently, the control section 110 determines (step SB3) whether or not a freeze function is set to the ON state. Here, the freeze function denotes a function of continuing to project the picture (as a still image), which has been projected immediately before the video signal has been broken. If the freeze function has been set to the ON state, the control section 110 continues to project (step SB4) the picture, which has been displayed before the breakage, after the video signal is broken. In contrast, if the freeze function is set to the OFF state, the control section 110 skips (omits) the process in the step SB4.

Then, the control section 110 determines (step SB5) whether or not the number of input sources, which are supplying the video signals, has changed due to the fact that, for example, the video signal is newly supplied from another input source. When the video signal is newly supplied from another input source, the control section 110 activates the input source, and then makes the picture corresponding to the video signal be projected (step SB6).

In contrast, in the case in which the number of the input sources supplying the video signals has not changed, the control section 110 determines (step SB7) whether or not the elapsed time (t1) described above has reached a predetermined threshold value (Th1). The control section 110 repeats the process corresponding to the step SB6 and the subsequent steps until the elapsed time reaches the predetermined threshold value, while in the case in which the elapsed time has reached the predetermined threshold value, the control section 110 makes (step SB8) the portal screen be projected.

By adopting such a configuration, if the user switches the input source within the predetermined period of time, it is possible to prevent the portal screen from being displayed. Therefore, in the case in which the user, who is used to the switching operation of the input source, uses the projector 100, the portal screen is prevented from being displayed, while in the case in which, for example, the user, who is not used to such an operation, takes time to connect the new input source, it is possible to display the portal screen to provide the information contributing to the subsequent operations.

Figure 6:
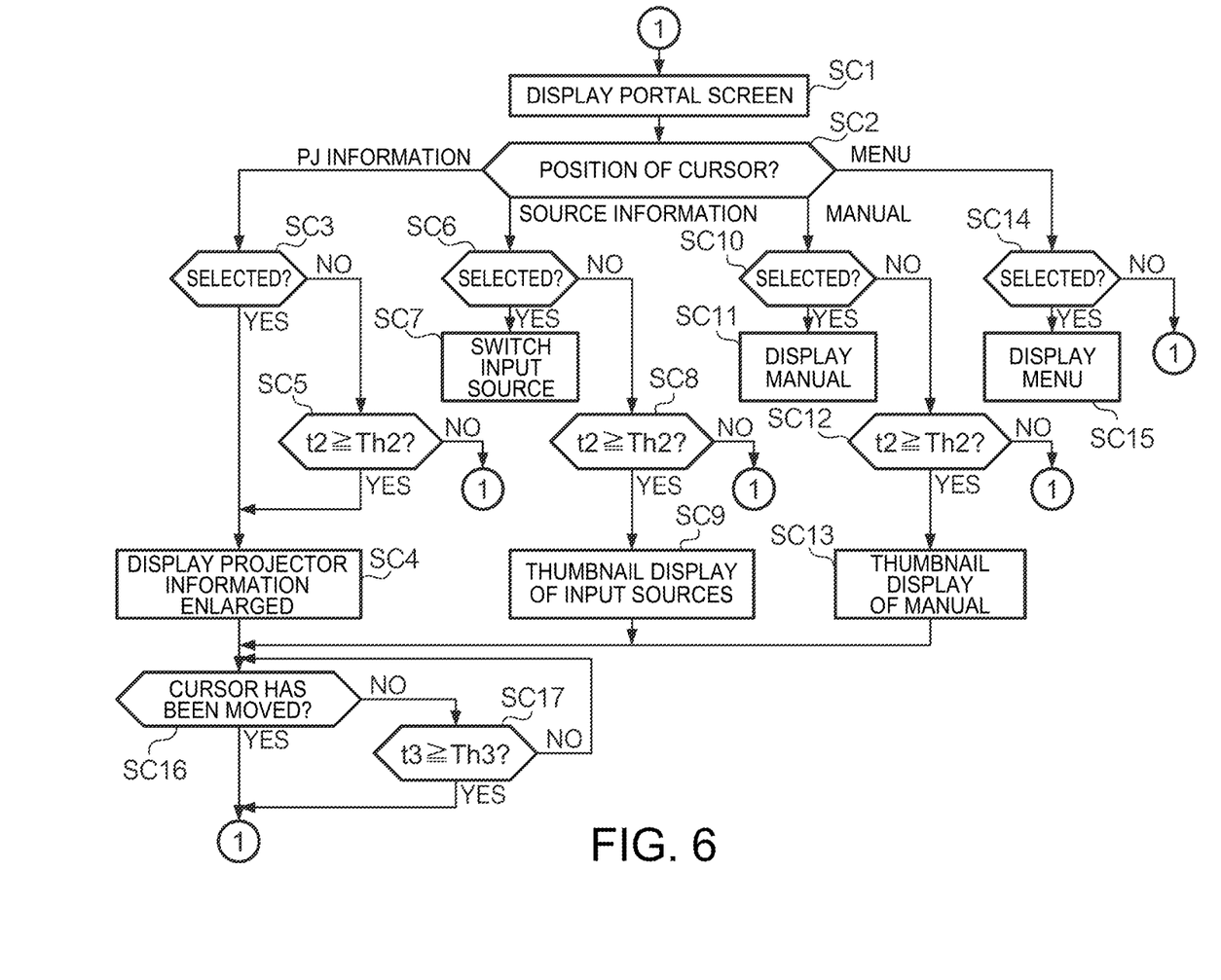
FIG. 6 is a flowchart showing a process executed in the projector.

FIG. 6 is a flowchart showing a process performed after displaying the portal screen. Here, it is assumed that the user can place the cursor on either of the four selection items of "projector information," "source information," "menu," and "manual" in the portal screen. It should be noted that in FIG. 6, the projector information is also described as "PJ information" because of space limitations.

In this case, the control section 110 firstly makes (step SC1) the portal screen be displayed. The position of the cursor on this occasion is not particularly limited, but is assumed to be a predetermined position set in advance. Subsequently, in the case in which the operation for moving the cursor is received, the control section 110 determines (step SC2) the position of the cursor after the movement, and then executes the process corresponding to the position of the cursor after the movement. It should be noted that on this occasion, the control section 110 performs the measurement of the elapsed time (t2) from when the cursor has stopped.

In the case in which the "projector information" is pointed by the cursor, the control section 110 determines (step SC3) whether or not the operation for selecting this item has been performed. In the case in which the "projector information" has been selected, the control section 110 displays (step SC4) the projector information in an enlarged manner. Further, in the case in which the "projector information" has not been selected, the control section 110 determines (step SC5) whether or not the elapsed time (t2) has reached a predetermined threshold value (Th2), and then continues to display the portal screen displayed in the step SC1 until the elapsed time reaches the predetermined threshold value, while in the case in which the elapsed time has reached the predetermined threshold value, the control section 110 also displays (step SC4) the projector information in an enlarged manner.

Further, in the case in which the "source information" is pointed by the cursor, the control section 110 determines (step SC6) whether or not the operation for selecting this item has been performed. In the case in which the "source information" has been selected, the control section 110 sets the state in which either of the input sources can be selected, and then performs (step SC7) the switching to the input source selected. Further, in the case in which the "source information" has not been selected, the control section 110 determines (step SC8) whether or not the elapsed time (t2) has reached the predetermined threshold value (Th2), and then continues to display the portal screen displayed in the step SC1 until the elapsed time reaches the predetermined threshold value, while in the case in which the elapsed time has reached the predetermined threshold value, the control section 110 performs (step SC9) the thumbnail display of the input sources. The thumbnail display mentioned here can include, for example, thumbnails obtained from the video signals supplied from the input sources, respectively.

Further, in the case in which the "manual" is pointed by the cursor, the control section 110 determines (step SC10) whether or not the operation for selecting this item has been performed. In the case in which the "manual" has been selected, the control section 110 switches from the portal screen to the display screen of the manual to display (step SC11) the manual. Further, in the case in which the "manual" has not been selected, the control section 110 determines (step SC12) whether or not the elapsed time (t2) has reached the predetermined threshold value (Th2), and then continues to display the portal screen displayed in the step SC1 until the elapsed time reaches the predetermined threshold value, while in the case in which the elapsed time has reached the predetermined threshold value, the control section 110 performs (step SC13) the thumbnail display of the manual. The thumbnail display mentioned here denotes, for example, what is obtained by making the thumbnails of the pages frequently viewed among all of the pages of the manual to thereby make it easy for the user to select the pages.

Further, in the case in which the "menu" is pointed by the cursor, the control section 110 determines (step SC14) whether or not the operation for selecting this item has been performed. In the case in which the "menu" has been selected, the control section 110 switches from the portal screen to the display screen of the menu to display (step SC15) the menu. The screen displayed on this occasion is, for example, a predetermined OSD (On Screen Display) screen, but can also be a screen displaying only the items used frequently among the items of the menu. If the "menu" has not been selected, the control section 110 continues to display the portal screen displayed in the step SC1.

Figure 7:
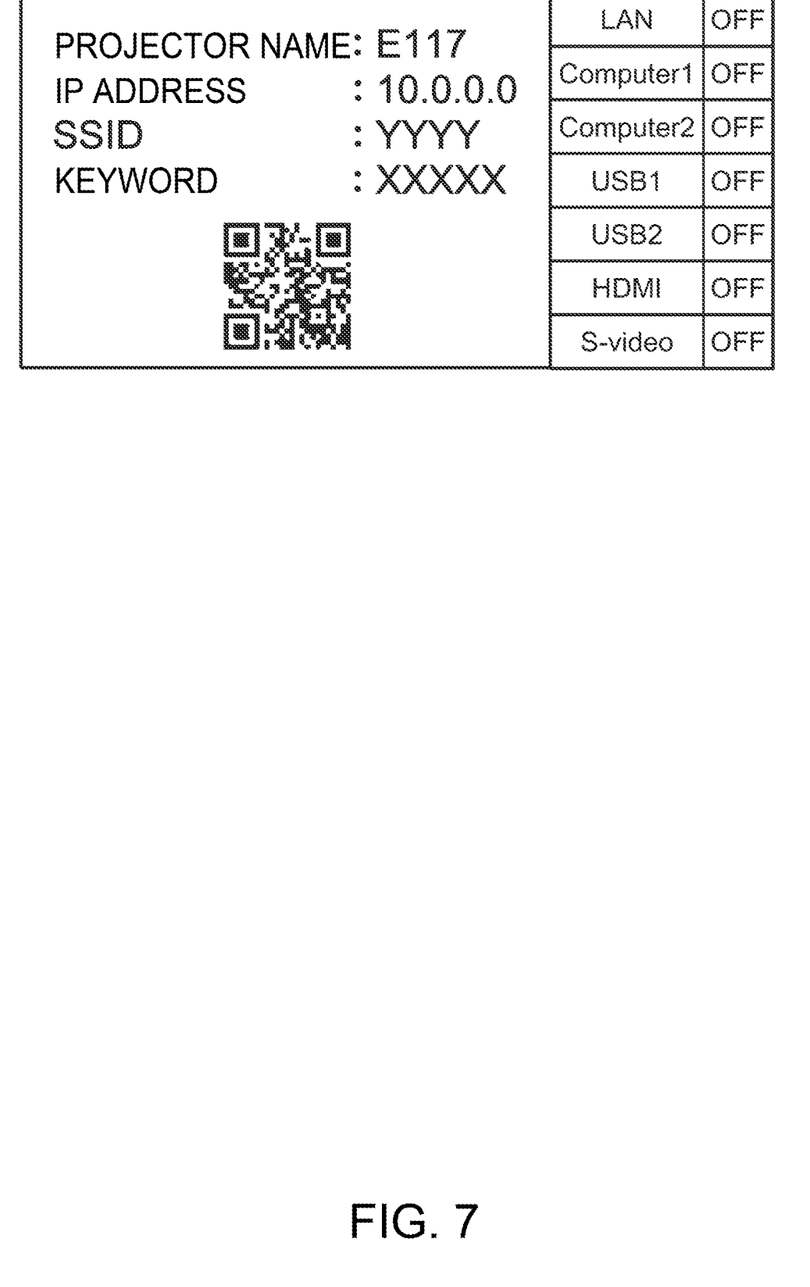
FIG. 7 is a diagram showing a display example in the case of displaying projector information in an enlarged manner.

FIG. 7 is a diagram showing a display example in the case of displaying the projector information in an enlarged manner. By displaying the projector information in an enlarged manner, the amount of information increases compared to the amount of the projector information before the enlargement. For example, it is arranged that the projector 100 additionally displays some items, which have not been displayed before the enlargement, in the case of displaying the projector information in an enlarged manner.

In the case in which the projector information is displayed in an enlarged manner, or the thumbnail display of the manual is performed, the control section 110 determines (step SC16) whether or not the cursor has moved to another selection item. In the case in which the cursor has moved to another selection item, the control section 110 terminates the enlarged display or the thumbnail display, and then displays the portal screen, which has been displayed in the step SC1, once again. Further, even in the case in which the cursor has not moved to another selection item, the control section 110 determines (step SC17) whether or not the elapsed time (t3) from the switching to the enlarged display or the thumbnail display is equal to or longer than a predetermined threshold value (Th3), and if the elapsed time has reached the predetermined threshold value, the control section 110 terminates the enlarged display or the thumbnail display, and then make the portal screen, which has been displayed in the step SC1, be displayed once again.

As described above, according to the present embodiment, it becomes possible to switch between display and nondisplay of the portal screen depending on needs in such a manner as described below. That is, the portal screen is displayed in the case in which there is a high possibility that the user is wavering over what to do subsequently such as the case in which the operation of the user is not fixed, while the portal screen is prevented from being displayed in the case in which there is a high possibility that what to do subsequently can uniquely be identified.

Modified Examples

The invention is not limited to the embodiment described above, but can be put into practice with the configurations described below as examples. Further, the invention can also be put into practice with the configurations obtained by combining the modified examples described below if necessary.

(1) As described above, it is also possible that in the case in which the selection by the selection section 112 is not fixed and a predetermined condition is fulfilled, the determination section 111 determines that the portal screen will be displayed. In this case, it is also possible for the projection section 140 to project the portal screen in which the selection item corresponding to the operation of the user in the case of fulfilling the predetermined condition is pointed by the cursor. For example, in the case in which the predetermined condition mentioned here is fulfilled, when the user has moved the cursor in the "source information," it is possible for the projection section 140 to project the portal screen in the state in which the cursor is placed on the "source information." Alternatively, on this occasion, it is possible for the projection section 140 to project the portal screen in the state in which the cursor is placed on the manual or the help related to the source information. By adopting this configuration, it is possible to arrange that the information necessary for the user can more easily be obtained.

(2) In the embodiment described above, it is assumed that in the case in which the video signals are supplied simultaneously from two or more input sources, the projector 100 uses the video signal supplied from the active input source for the projection. However, in the case in which the video signals are simultaneously supplied from two or more input sources, it is possible for the projector 100 to display the portal screen. This is because in such a case, the input source to be the projection target is not necessarily identified uniquely.

(3) The invention can be applied to display devices other than the projectors. In this case, the display device is provided with a display section instead of the projection section 140. The display section mentioned here is formed of a direct-view display represented by, for example, a liquid crystal panel, and a control section for the direct-view display. Further, the invention can also be understood as a projection method of a projector, or a display method of a display device. Further, the invention can also be provided in the form of the program for functioning as the projector according to the invention. Further, the program according to the invention can also be provided in the configuration in which the program is supplied to the projector via a network or other communication equipment, and is then installed to be available.

(4) Although in the embodiment described above, it is assumed that the portal screen is configured including a first region A1 in which the projector information is displayed, a second region A2 in which a variety of guides of operations are displayed, and a third region A3 in which source information related to the input sources is displayed, the invention is not limited to this configuration, but the regions are divided based on a different classification. Further, although the explanation is presented assuming that the user can place the cursor on either of the four selection items of "projector information," "source information," "menu," and "manual" in the portal screen, the invention is not limited to this configuration, but the selection items can be set based on a different classification.

What is claimed is:

1. A projector comprising:
   an input section adapted to input a video signal;
   a storage section which stores a portal screen, the portal screen including
   (i) a first region in which a service set identifier ("SSID") of the projector and information related to connection between the projector and an external device are displayed,
   (ii) a second region in which a plurality of selection items for changing the operation of the projector is displayed, and
   (iii) a third region in which information representing a plurality of input sources with which the projector is compliant is displayed, the plurality of input sources including a local area network ("LAN") source;
   a processor configured to perform operations of a determination section and a selection section, wherein:
      the determination section is adapted to determine whether the video signal is input by the input section and whether the portal screen needs to be displayed based on presence or absence of the video signal input by the input section at the time of startup; and
      the selection section is adapted to select, in accordance with an operation by the user, one of the plurality of input sources from the plurality of input sources having been displayed in the portal screen; and
   a projection section adapted to project either of a picture corresponding to the video signal and the portal screen in accordance with a determination result by the determination section,
   wherein
      in response to a determination by the determination section that no video signal is input when the portal screen is not currently being displayed, the determination section determines that the portal screen is to be displayed and makes the projection section display the portal screen, and
      in a case in which the operation by the user has not been performed for a predetermined time, the projection section projects thumbnails obtained from video signals supplied from the plurality of input sources.

2. The projector according to claim 1, wherein
   the input section inputs the video signal supplied from an active input source among the plurality of input sources,
   in a case in which the input of the video signal from the active input source is broken, the projection section continues to project the picture, which has been projected immediately before the input is broken, and
   in a case in which a predetermined time has elapsed from when the input of the video signal from the active input source has been broken, the determination section determines that the portal screen is to be displayed.

3. The projector according to claim 1,
   wherein the selection section is further adapted to select, in accordance with an operation by the user, a selection item from the plurality of selection items having been displayed in the portal screen; and
   the projector further comprises a process execution section adapted to execute a process corresponding to the selection item having been selected by the selection section,
   wherein
      the portal screen is divided into a plurality of sections, each including at least one selection item,
      the projection section projects the portal screen in which one of the plurality of sections is pointed to by a cursor, and
      in a case in which the selection by the selection section is not carried out for a predetermined amount of time, the determination section determines that the section of the portal screen pointed to by the cursor is to be displayed in an enlarged manner and the projection section displays the section of the portal screen in the enlarged manner.

4. The projector according to claim 1, wherein
   the input section inputs either of the video signals supplied from the plurality of input sources, and
   in a case in which the video signals are simultaneously supplied from two or more of the plurality of input sources, the determination section determines that the portal screen is to be displayed.

5. The projector according to claim 1, wherein
the portal screen further includes
- (iv) a fourth region in which projector information is displayed, and
- (v) a fifth region in which a variety of guides of an operation are displayed.

6. The projector according to claim 5, wherein
the projector information is information related to network connection of the projector.

7. The projector according to claim 5, wherein
a link for displaying a manual is disposed in the fifth region in which the variety of guides of the operation are displayed, and
the manual contains instructions for using the projector.

8. The projector according to claim 1, wherein
the input section inputs the video signal supplied from an active input source among the plurality of input sources,
the active input source is an input source for which the projection section projects the picture corresponding to the video signal input from the active input source, selected from among the plurality of input sources, and
in a case in which no video signal is input from the selected active input source, the determination section determines that the portal screen is to be displayed.

9. The projector according to claim 1, wherein
the SSID of the projector and the information related to connection between the projector and the external device are partially coded and displayed as one-dimensional or two-dimensional code information.

\* \* \* \* \*